United States Patent
Okita et al.

(10) Patent No.: US 8,305,016 B2
(45) Date of Patent: Nov. 6, 2012

(54) CONTROL DEVICE WITH LEARNING FUNCTION FOR ELECTRIC MOTORS

(75) Inventors: Tadashi Okita, Yamanashi (JP); Yukio Toyozawa, Yamanashi (JP); Naoto Sonoda, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 584 days.

(21) Appl. No.: 12/212,058

(22) Filed: Sep. 17, 2008

(65) Prior Publication Data
US 2009/0102409 A1    Apr. 23, 2009

(30) Foreign Application Priority Data

Oct. 22, 2007  (JP) .................................. 2007-274131

(51) Int. Cl.
    *H02P 1/54*    (2006.01)
(52) U.S. Cl. .......................................... 318/34; 318/41
(58) Field of Classification Search ............ 318/34, 318/41, 49, 35, 51
    See application file for complete search history.

(56) References Cited

U.S. PATENT DOCUMENTS

| | | | |
|---|---|---|---|
| 4,094,481 A | | 6/1978 | DeWalt |
| 4,206,620 A | * | 6/1980 | Eaton .............................. 72/17.2 |
| 5,231,335 A | * | 7/1993 | Mega et al. ....................... 318/85 |
| 5,252,900 A | * | 10/1993 | Uehara et al. ............ 318/568.11 |
| 5,621,672 A | * | 4/1997 | Kobayashi et al. ................ 700/5 |
| 5,929,575 A | * | 7/1999 | Hyodo .............................. 318/69 |
| 6,534,944 B2 | * | 3/2003 | Toyozawa et al. ............ 318/625 |
| 6,823,235 B2 | * | 11/2004 | Toyozawa et al. ............ 700/193 |
| 7,183,739 B2 | * | 2/2007 | Iwashita et al. ............... 318/625 |
| 2006/0158143 A1 | * | 7/2006 | Okita et al. .................... 318/276 |

FOREIGN PATENT DOCUMENTS

| | | |
|---|---|---|
| EP | 1324167 A2 | 7/2003 |
| JP | 02097291 A | 4/1990 |
| JP | 5306758 A | 11/1993 |
| JP | 11-305839 | 11/1999 |
| JP | 2007-042068 | 2/2007 |

OTHER PUBLICATIONS

Notice of Reasons for Rejection for JP2007-274131 mailed Feb. 17, 2009.
EP Extended Search Report for EP08016377 mailed Jan. 19, 2009.

\* cited by examiner

*Primary Examiner* — Rina Duda
(74) *Attorney, Agent, or Firm* — Lowe Hauptman Ham & Berner, LLP

(57) ABSTRACT

A control device for electric motors, capable of precisely moving one object by using two electric motors based on periodically repeated commands. The control device includes a first learning controller for calculating an amount of correction so that a positional deviation of a first electric motor is minimized, and a second learning controller for calculating an amount of correction so that a positional deviation of a second electric motor is minimized. The first and second learning controllers are independent from each other, and configured to minimize the positional deviation of the corresponding electric motor. The parameters set in the learning controllers, each defining the response of learning control of each electric motor, are equal to each other.

9 Claims, 6 Drawing Sheets

CONTROL DEVICE WITH LEARNING FUNCTION FOR ELECTRIC MOTORS

RELATED APPLICATIONS

The present application claims priority from Japanese Patent Application No. 2007-274131, filed on Oct. 22, 2007, the entire content of which is fully incorporated herein by reference.

BACKGROUND OF THE INVENTION

1. Field of the Invention

The present invention relates to a control device with a learning function, for driving a plurality of electric motors so as to move an object to be moved.

2. Description of the Related Art

In a machine such as a machine tool or an industrial machine, in the case that an object or a workpiece, having relatively low stiffness, such as a thin pin or a thin plate needs be moved, if a force for moving the workpiece is applied to a part of the workpiece which is far from the center of gravity of the workpiece, the workpiece may be bent or twisted, whereby it may be difficult to precisely move the workpiece. In such a case, by using two electric motors for moving the different parts of one workpiece, the workpiece is prevented from being bent or strained, whereby stable control may be possible. For example, when a cantilever-type workpiece having low stiffness is rotated and processed, the workpiece may be twisted due to acceleration or deceleration of torque and/or a machining load, whereby a precise rotational control of the workpiece cannot be realized. In such a case, torsion of the workpiece may be avoided by holding both ends of the workpiece, whereby precise rotational control may be realized.

However, depending on the configuration of the machine and/or the type of the workpiece, an imbalance may occur between each load applied to each electric motor. For example, in the case that the workpiece is rotated while both ends thereof are held, when a load applied to one electric motor becomes larger than a load applied to another electric motor, the response of the first electric motor is lowered and a delay occurs in acceleration/deceleration of the electric motor, whereby the workpiece may be twisted or vibrated. At this point, in order to equalize each response of each electric motor, it is necessary to adjust a speed gain of each electric motor corresponding to the type of the workpiece, as well as equalize a position gain of each electric motor. However, since there are a variety of workpieces such adjustment requires many man-hours.

In some cases, the types of electric motors for moving or rotating one workpiece are different. In such a case, the response of each electric motor may be different, whereby precise control cannot be realized.

Generally, in the case that an electric motor needs be precisely controlled based on periodically repeated commands for executing a periodic operation such as a reciprocating movement, a learning control is quite effective. For example, Japanese Unexamined Patent Publication No. 11-305839 discloses a control method for controlling a plurality of electric motors for moving one workpiece. In this method, a learning control is used for controlling one electric motor, and an amount of correction obtained by the learning control is used for controlling the other electric motors.

Japanese Unexamined Patent Publication No. 2007-42068 discloses a servo control device for executing synchronous control of two driving sources for driving two driving shafts, by which data for correcting a positional deviation of one driving source is calculated based on a synchronous error.

In the control method as described in Japanese Unexamined Patent Publication No. 11-305839, precise control may be possible when a workpiece has high stiffness. However, if the stiffness of the workpiece is relatively low, the workpiece may be easily bent or twisted. Therefore, if the amount of correction obtained by the learning control is used for controlling the other electric motors, precise control is not always possible. Further, when there is an imbalance between each load of each electric motor, even if the learning control as described in Japanese Unexamined Patent Publication No. 11-305839 is used, it is difficult to execute precise control because the response of each electric motor is different from each other.

In addition, the technique as described in Japanese Unexamined Patent Publication No. 2007-42068 is intended to reduce a synchronous error between a master side and a slave side, and therefore the technique cannot solve the above problem based on the difference between each response of the electric motors.

SUMMARY OF THE INVENTION

An object of the present invention is to provide a control device capable of precisely moving or driving one workpiece, when the workpiece is moved or driven by a plurality of electric motors based on periodically repeated commands.

According to the present invention, there is provided a control device for electric motors, for moving one object to be moved by using two electric motors based on periodically repeated commands, the control device comprising: positional deviation calculating parts each for calculating a positional deviation of each electric motor; learning control parts each for calculating an amount of correction of positional deviation so that each positional deviation calculated by the positional deviation calculating part is minimized; and positional deviation correcting parts each for correcting each positional deviation based on the amount of correction calculated by each learning control part; wherein each learning control part is arranged independently of each electric motor, and a parameter set for each learning control part, defining a response of the learning control, is equal to each other.

The control device of the invention may further comprise: a monitoring part for monitoring whether the difference between each amount of correction of positional deviation output from each learning control part is within a predetermined range; and a clamping part for clamping an output of each learning control part when the difference exceeds the predetermined range.

The control device of the invention may further comprise a gain adjusting part for automatically adjusting a speed gain of one of the electric motors so that the difference between each amount of correction of positional deviation output by each learning part is minimized.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTION

Figure 1:
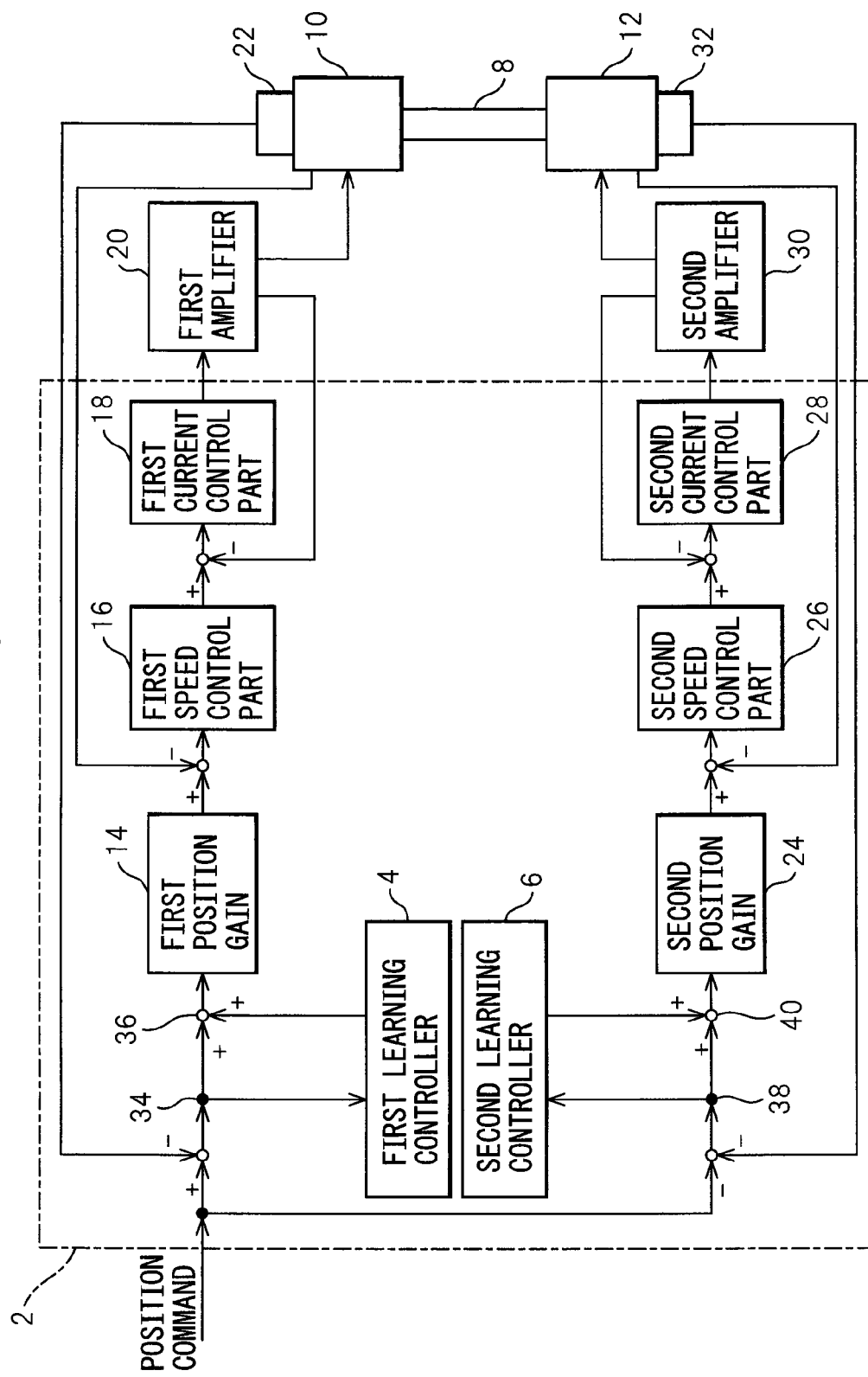
FIG. 1 is a block diagram of a control device according to a first embodiment of the invention.

FIG. 1 is a block diagram of a control device 2 according to a first embodiment of the invention. Control device 2 is used for rotating a crankpin 8 by means of first and second electric motors 10 and 12. Control device 2 periodically outputs a command for controlling the electric motors.

In relation to first electric motor 10, when a position command (or a movement command) output from a numeric control device (not shown) is input to control device 2, a first position gain 14 outputs a speed command. Next, a first speed control part 16 outputs a torque command based on the speed command, a first current control part 18 outputs a voltage command based on the current command, and then a first amplifier 20 rotatably activates first electric motor 10. A first position detector 22 is attached to first electric motor 10 and a detected value from first position detector 22 is used for position feedback. Speed feedback and current feedback are also used for controlling the speed and the current of the electric motor, respectively.

Similarly, in relation to second electric motor 12, when a position command (or a movement command) output from a numeric control device (not shown) is input to control device 2, a second position gain 24 outputs a speed command. Next, a second speed control part 26 outputs a torque command based on the speed command, a second current control part 28 outputs a voltage command based on the current command, and then a second amplifier 30 rotatably activates second electric motor 12. A second position detector 32 is attached to second electric motor 12 and a detected value from second position detector 32 is used for position feedback. Speed feedback and current feedback are also used for controlling the speed and the current of the electric motor, respectively.

Control device 2 has a first positional deviation calculating part 34 for calculating a positional deviation of first electric motor 10, a first learning controller 4 for calculating an amount of correction of positional deviation based on the calculated positional deviation so that the positional deviation of the first electric motor is minimized, and a first positional deviation correcting part 36 for correcting the positional deviation of the first electric motor based on the calculated amount of correction of positional deviation. Similarly, control device 2 has a second positional deviation calculating part 38 for calculating a positional deviation of second electric motor 12, a second learning controller 6 for calculating an amount of correction of positional deviation based on the calculated positional deviation so that the positional deviation of the second electric motor is minimized, and a second positional deviation correcting part 40 for correcting the positional deviation of the second electric motor based on the calculated amount of correction of positional deviation. First and second learning controllers 4 and 6 act independently each other so that the positional deviation of each electric motor is minimized, however, the learning controllers use the same parameter defining a response of learning control.

Generally, in learning control, a predetermined response is repeatedly learned. Thus, in the case that one workpiece is moved or rotated by using two electric motors, when a learning controller is independently arranged on each electric motor and a parameter defining a response of learning control in each learning controller is set to the same value, each electric motor may have the same response, regardless of an imbalance in the load of each electric motor. For example, in the case that a crankpin is held at both ends thereof and both ends are rotatably driven, even if the load applied to one electric motor is considerably larger than the load applied to another electric motor, according to the invention, by periodically repeating learning control, the response of each electric motor may finally converge on the predetermined value.

As a result, it is not necessary to adjust the speed gain of each electric motor in order to equalize the response of each electric motor. Further, even when the type of workpiece is varied, by repeating learning control, each electric motor may have the same response, whereby a torsion of the workpiece may be avoided and rotational control with high accuracy may be achieved.

Figure 2:
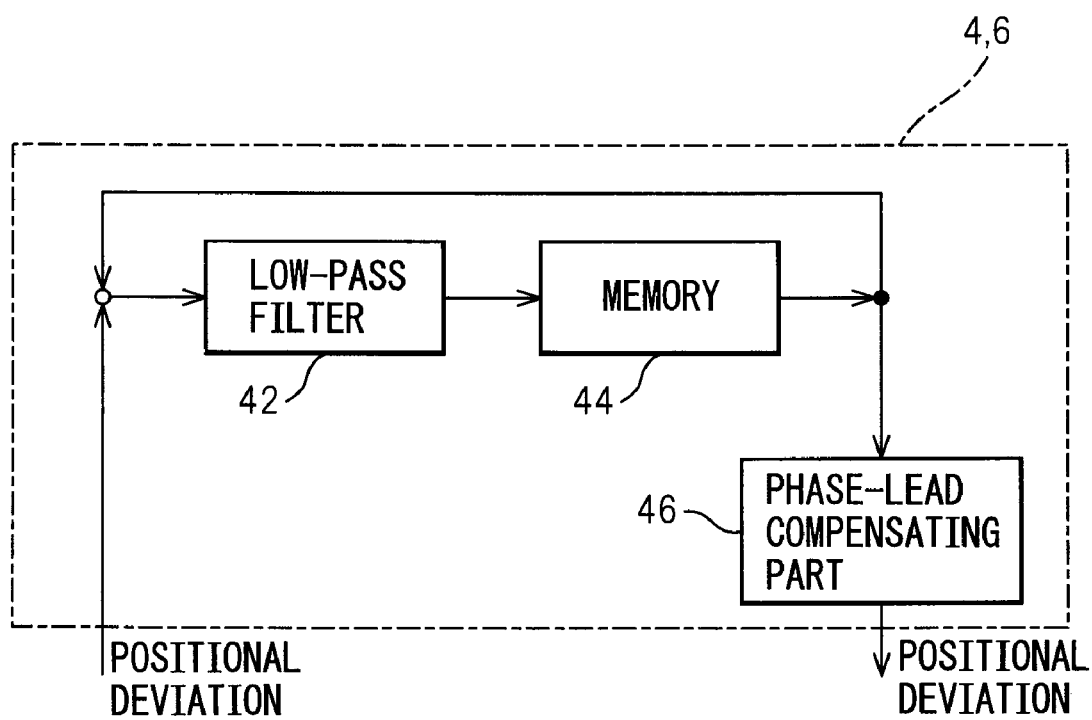
FIG. 2 is a block diagram showing an example of a learning controller of FIG. 1.

FIG. 2 is a block diagram showing a preferred embodiment of each learning controller. Each of first and second learning controllers 4 and 6 has a low-pass filter 42, a memory 44 for storing periodic positional deviation data having the same period of time as the periodically repeated commands, a phase-lead compensator 46 for independently leading a phase of each electric motor based on the characteristic of each electric motor. A cut-off frequency of low-pass filter 42 is used to define a response of learning control, and the cut-off frequency of the low-pass filter of each learning controller is the same.

In learning control using the control device according to the first embodiment, when the load applied to one electric motor is significantly larger than the load applied to another electric motor, torque interference may occur between the electric motors and it takes a time to converge the positional deviation on a predetermined value. This is because the response of each electric motor is different from each other during a converging process of the positional deviation. Due to this, a large torsional force is applied to the crankpin for a relatively long time. Further, when a learning controller is independently arranged on each electric motor having the different response, during a learning process of learning control, the amount of correction of each electric motor is different since a pattern of convergence in each electric motor is different, whereby a torsional force may be applied to the workpiece. A similar different response may occur due to an error in setting a control parameter for the electric motor. As the positional deviation may diverge in such cases, it is necessary to reduce a damage applied to the workpiece. A second embodiment as shown in FIG. 3 is intended to avoid the above disadvantages.

Figure 3:
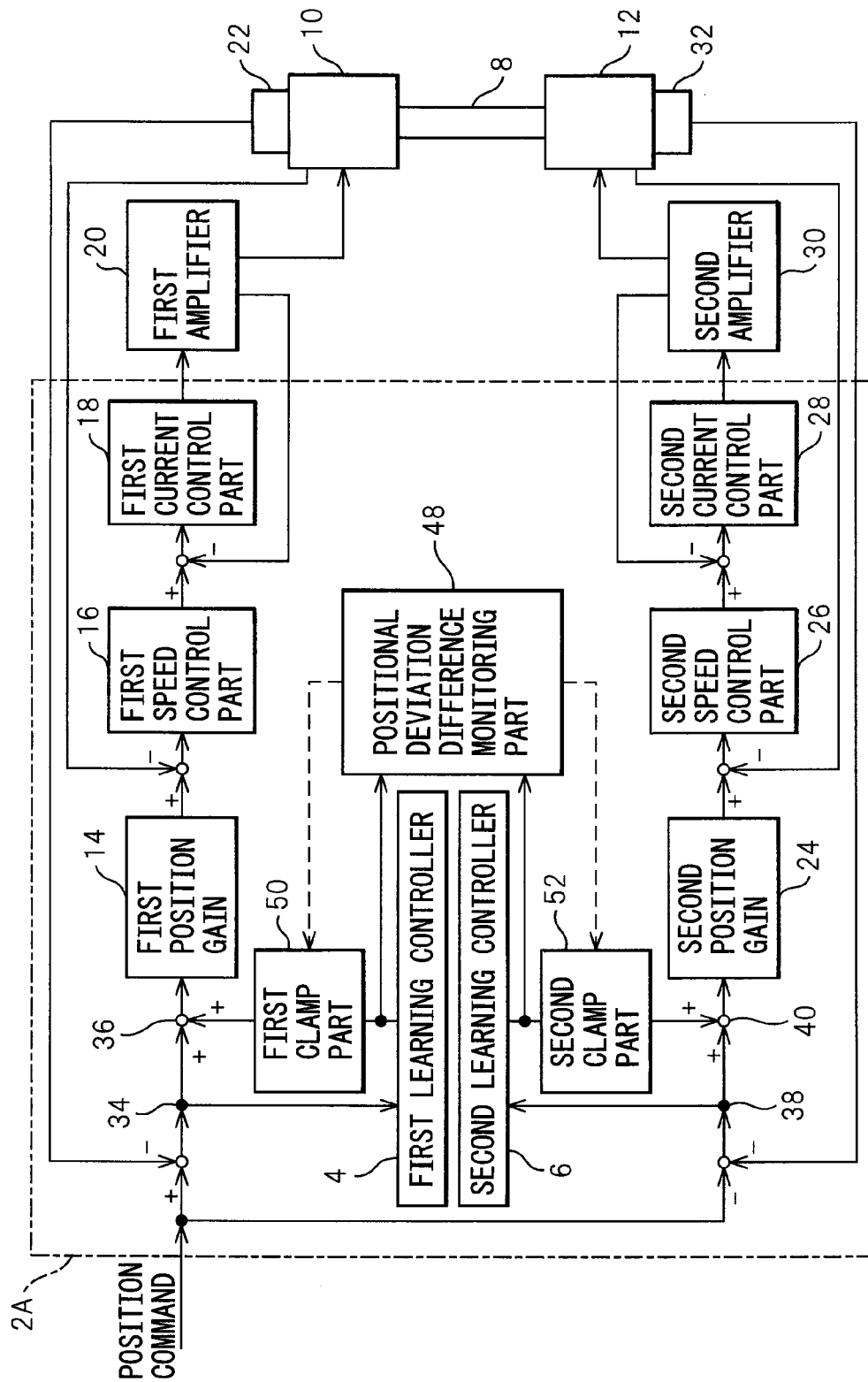
FIG. 3 is a block diagram of a control device according to a second embodiment of the invention.

A control device 2A according to the second embodiment as shown in FIG. 3 is different from the first embodiment in that control device 2A has a monitoring part 48 for calculating and monitoring the difference between amounts of correction of positional deviation output from learning controllers 4 and 6, and first and second clamping parts 50 and 52 each for clamping the amount of correction of positional deviation output from each learning control part when the difference exceeds a predetermined range. Since the other components of control device 2A may be the same as those of control device 2 of the first embodiment, a detailed explanation thereof is omitted.

Concrete functions of monitoring part 48 and clamping parts 50, 52 will be described below. First, amounts of correction of first and second electric motors 10 and 12 calculated by first and second learning controllers 4 and 6 are referred to as M1 and M2, respectively. A monitoring level for the difference between the amounts of correction is referred to as Sa, and clamp levels of correction of first and second electric motors 10 and 12 are referred to as L1 and L2, respectively. In this case, when |M1−M2|>Sa, M1 and M2 are clamped or limited to L1 and L2, respectively (however, if M1 and M2 are negative values, M1=−L1 and M2=−L2). Due to such a control operation, a disadvantageous load applied to the workpiece, which may cause the distortion of the workpiece during a converging process of learning control, may be eliminated or reduced. In addition, when the amount of correction is clamped, it generally takes longer time than in the first embodiment, to substantially eliminate the disadvantageous load. However, even in such a case, the disadvantageous load is ultimately eliminated.

One possible way to reduce the above torque interference between the electric motors is to adjust a speed gain so that the response of each electric motor is equal to each other so as to improve the convergence performance of the deviation. However, in the actual production field, it is generally difficult to adjust the speed gain corresponding to the type or the shape of the workpiece. Generally, when the response of each electric motor is different from each other, each learning controller ultimately outputs an amount of correction so that the response of each electric motor coincides with a response predetermined in each learning controller. At this point, by equalizing each predetermined response, each electric motor may ultimately have the same response. However, it may take long time to make the response convergent, since interference may occur between each electric motor because of the difference between the responses of the electric motors during the learning control.

For example, when the response of the second electric motor is lower than the response of the first electric motor, the second electric motor delays relative to the first electric motor during acceleration. By applying the learning control to such a case, an amount of correction is output in order to eliminate or reduce the delay. At this point, the amount of correction for the second electric motor is larger than that for the first electric motor. By adjusting the speed gain of the second electric motor so that the amount of correction for the second electric motor generally equal to the amount of correction of the first electric motor, a convergence rate of the learning control for the next workpiece may be improved.

Figure 4:
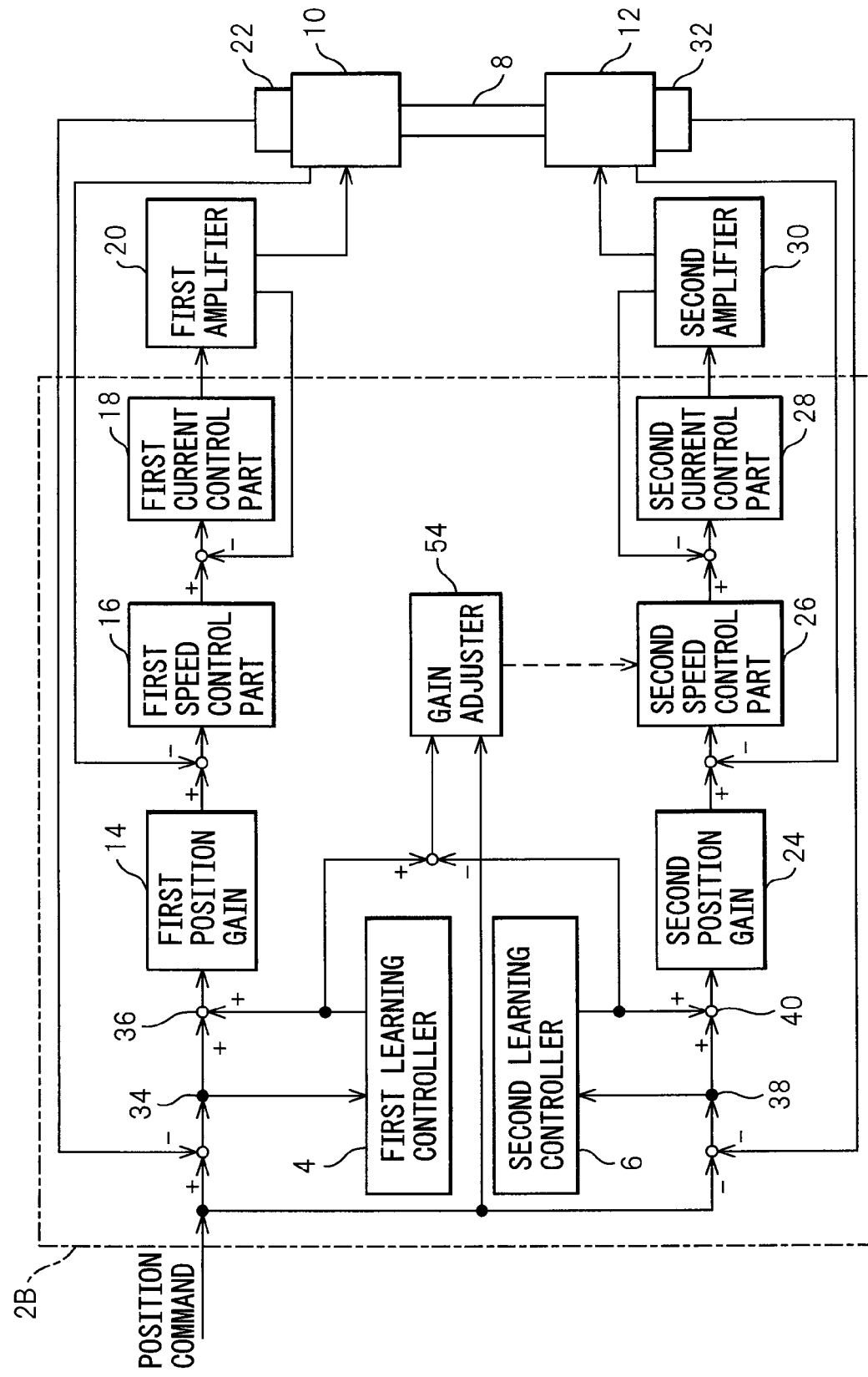
FIG. 4 is a block diagram of a control device according to a third embodiment of the invention.

A control device 2B according to a third embodiment as shown in FIG. 4 has a gain adjuster 54 which is configured to automatically adjust a speed gain of one of the electric motors so that the difference between the amount of correction output by each learning controller, after the deviation sufficiently converges by learning control. Since the other components of control device 2B may be the same as those of the first embodiment, a detailed explanation thereof is omitted.

Gain adjuster 54 calculates the difference between amounts of correction M1 and M2 of the positional deviation output by the first and second controllers, and automatically adjust the speed gain of the first or second electric motor (in the drawing, the second electric motor) so that the difference is decreased, preferably, minimized. When the speed gain of the second electric motor includes an integral gain k1 and a proportional gain k2, a formula for calculating gains k1($n$) and k2($n$) is described below. At this point, the expression "n" means a calculation result of the current sampling period, and the expression "n−1" means a calculation result of the previous sampling period. Further, the character "α" is a constant which is experimentally or empirically determined. In addition, the difference between the amounts of correction is increased during acceleration or deceleration, and the calculation of the speed gain depends on positive and negative polarities of the acceleration. Therefore, in the formula, a second-order derivative Dr of the position command is used.

$$k1(n)=k1(n-1)-\alpha \cdot Dr(n) \cdot (M1(n)-M2(n))$$

$$k2(n)=k2(n-1)-\alpha \cdot Dr(n) \cdot (M1(n)-M2(n))$$

Due to the above procedure, the speed gain of each electric motor may be equivalent to each other, and thus the convergence rate of the learning control for driving the workpiece may be improved.

As is not shown, another embodiment, including all of the monitoring part and the clamping part of the second embodiment and the gain adjuster of the third embodiment, is possible.

Figure 5:
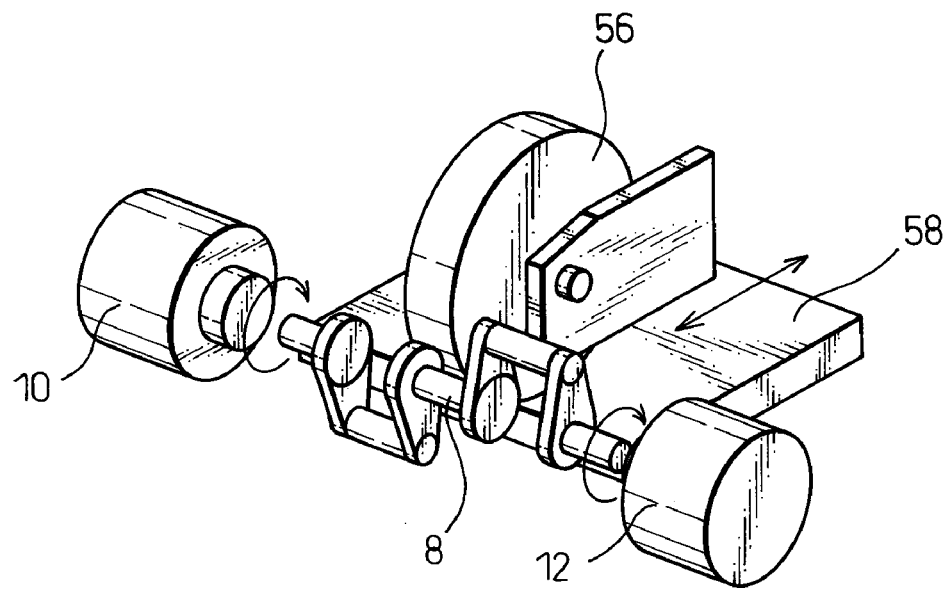
FIG. 5 is a schematic view showing a first example of a mechanical constitution to which the invention may be applied.

FIGS. 5 to 8 schematically show concrete examples to which the present invention may be applied. FIG. 5 shows a first mechanical constitution example, in which crankpin 8 is held at the both ends thereof and rotated by means of first and second electric motors 10 and 12, and then grinded by a grinder 56. Grinder 56 is configured to move relative to crankpin 8 by means of a linear motor 58. In such a case, a stress may be applied to crankpin 8 if the response of each electric motor is different. However, according to the invention, the response of each electric motor may be equalized.

Figure 6:
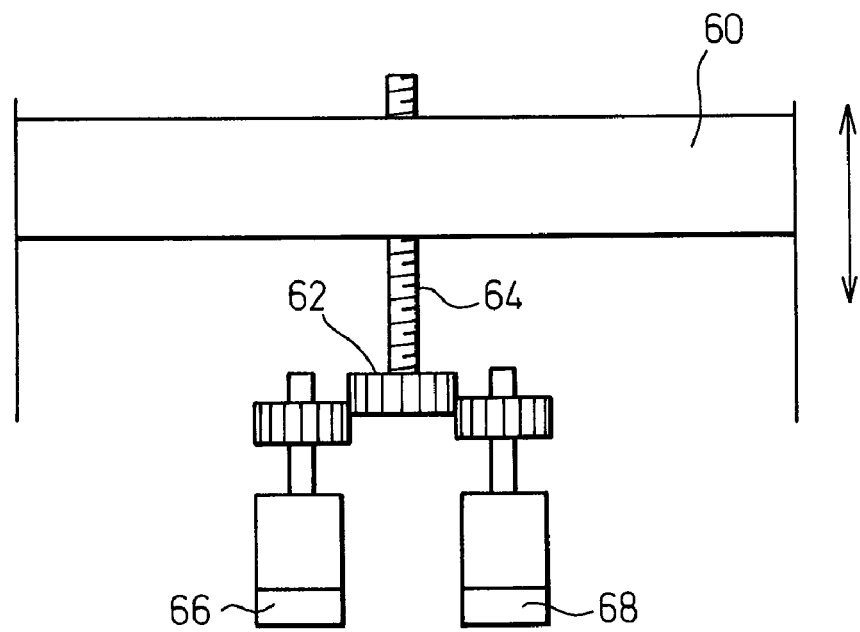
FIG. 6 is a schematic view showing a second example of a mechanical constitution to which the invention may be applied.

FIG. 6 shows a second mechanical constitution example, in which a relatively large member or device 60 is moved in the vertical direction by means of a shaft 64 having a gear 62. Since device 60 is heavy, gear 62 is rotated by using two electric motors 66 and 68. In such a case, a stress may be applied to gear 62 if the response of each electric motor is different. However, according to the invention, the response of each electric motor may be equalized.

Figure 7:
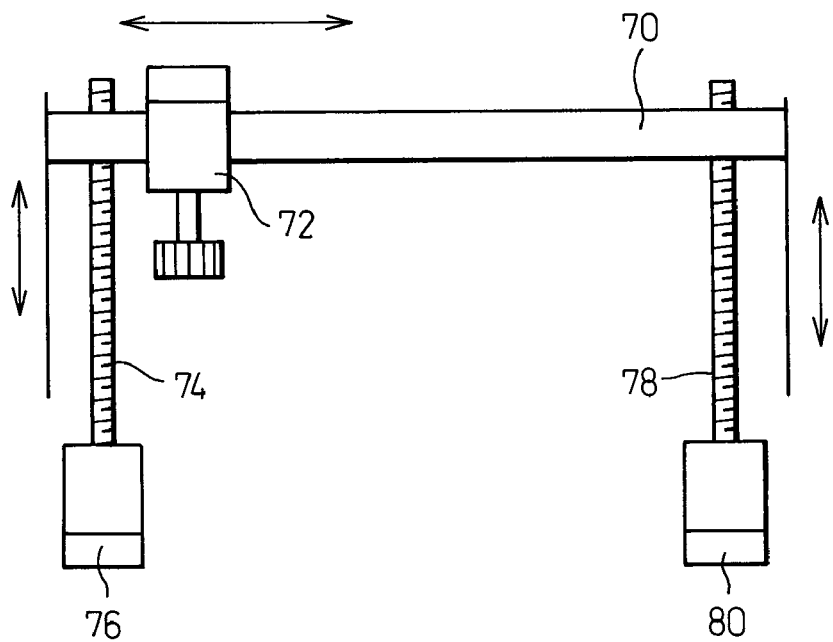
FIG. 7 is a schematic view showing a third example of a mechanical constitution to which the invention may be applied.

FIG. 7 shows a third mechanical constitution example, in which a relatively large member or device 70 extending in the lateral direction (in the horizontal direction in FIG. 7) carries a heavy article 72 such as an electric motor configured to move in the lateral direction. The horizontal balance of device 70 is maintained by means of an electric motor 76 having a shaft 74 and an electric motor 80 having a shaft 78. In such a case, as article 72 is positioned at the left side of device 70, a load applied to electric motor 76 at the left side is larger than a load applied to electric motor 80 at the right side. According to the invention, even when the load imbalance exists, the response of each electric motor may be equalized.

Figure 8:
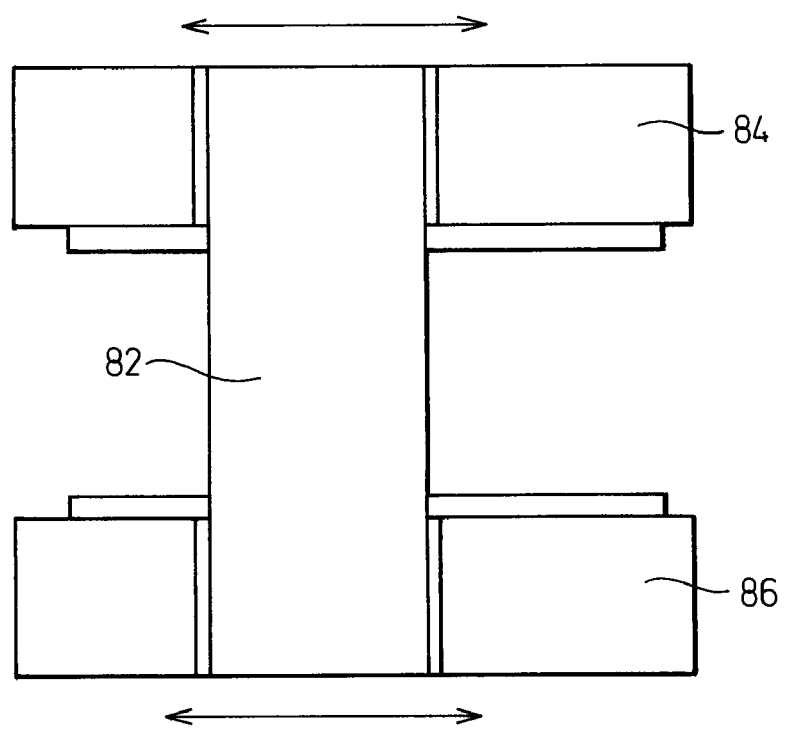
FIG. 8 is a schematic view showing a fourth example of a mechanical constitution to which the invention may be applied.

FIG. 8 shows a fourth mechanical constitution example, in which a table 82 is supported at both ends thereof by means of two linear motors 84 and 86, and then table 82 may be moved in the lateral direction. In such a case, a stress may be applied to table 82 if the response of each linear motor is different. However, according to the invention, the response of each linear motor may be equalized and the stress applied to the table may be reduced.

According to the control device of the present invention, in the case that one object or workpiece is moved or driven by means of two electric motors, even when load imbalance exists between the electric motors, the response of each electric motor may be equalized, by independently arranging a learning controller on each electric motor, each learning having the same parameter defining the response of corresponding electric motor. Therefore, even when the workpiece has a low stiffness, a control operation with high accuracy may be carried out without generating significant deflection and distortion in the workpiece.

According to the invention, a preferred embodiment of the learning controller is provided.

When a large load may be applied to the workpiece during the learning control, the load may be reduced by providing the clamping part and the monitoring part for monitoring the difference of the amounts of correction of the positional deviation, to the control device of the invention.

By providing the gain adjuster to the control device of the invention, the convergence performance in the learning control may be improved.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A control device for electric motors, for moving one workpiece to be moved by using two electric motors based on periodically repeated commands, the control device comprising:
   positional deviation calculating parts for calculating positional deviations of the electric motors, respectively;
   learning control parts for applying a learning control to control the electric motors, the learning control parts calculating amounts of correction of the positional deviations so that the positional deviations calculated by the positional deviation calculating parts are minimized, respectively, such that the positional deviations are converged to predetermined values, respectively; and
   positional deviation correcting parts for correcting the positional deviations based on the amounts of correction calculated by the learning control parts, respectively, wherein
   each learning control part is arranged to act independently for each of the electric motors, and
   a parameter defining response of learning control in one of the learning control parts is equal to a parameter defining response of learning control in the other learning control part.

2. The control device as set forth in claim 1, wherein each learning control part comprises:
   a low-pass filter having the same cut-off frequency as that of the other learning control part;
   a memory for storing periodic positional deviation data having the same period of time as the periodically repeated commands; and
   a phase-lead compensating part for independently leading a phase of the respective electric motor based on a characteristic of the electric motor.

3. The control device as set forth in claim 1, further comprising:
   a monitoring part for monitoring whether a difference between the amounts of correction of positional deviation output from the learning control parts is within a predetermined range; and
   a clamping part for clamping an output of each learning control part when the difference exceeds the predetermined range.

4. The control device as set forth in claim 1, further comprising a gain adjusting part for automatically adjusting a speed gain of either one of the electric motors so that a difference between the amounts of correction of positional deviation output by the learning parts is minimized.

5. The control device as set forth in claim 1, wherein each learning control part comprises:
   an input for receiving the positional deviation of the respective electric motor from the respective positional deviation calculating part; and
   an output for outputting the amount of correction of positional deviation to the respective positional deviation correcting part;
   wherein the input of the learning control part is positioned upstream of the output thereof.

6. A control device for electric motors, for moving one workpiece to be moved by using two electric motors based on periodically repeated commands, the control device comprising:
   positional deviation calculating parts for calculating positional deviations of the electric motors, respectively;
   learning control parts for applying a learning control to control the electric motors, the learning control parts calculating amounts of correction of the positional deviations so that the positional deviations calculated by the positional deviation calculating parts are minimized, respectively, such that the positional deviations are converged to predetermined values, respectively; and
   positional deviation correcting parts for correcting the positional deviations based on the amounts of correction calculated by the learning control parts, respectively, wherein
   each learning control part is arranged to act independently for each of the electric motors,
   a parameter defining response of learning control in one of the learning control parts is equal to a parameter defining response of learning control in the other learning control part, and
   each learning control part includes
      a low-pass filter having the same cut-off frequency as that of the other learning control part,
      a memory for storing periodic positional deviation data having the same period of time as the periodically repeated commands, and
      a phase-lead compensating part for independently leading a phase of each electric motor based on the characteristic of the electric motor.

7. The control device as set forth in claim 6, further comprising:
   a monitoring part for monitoring whether a difference between the amounts of correction of positional deviation output from the learning control parts is within a predetermined range; and
   a clamping part for clamping an output of each learning control part when the difference exceeds the predetermined range.

8. The control device as set forth in claim 6, further comprising a gain adjusting part for automatically adjusting a speed gain of either one of the electric motors so that a difference between the amounts of correction of positional deviation output by the learning parts is minimized.

9. The control device for electric motors as set forth in claim 6, wherein
   an input for receiving the positional deviation of the respective electric motor from the respective positional deviation calculating part; and
   an output for outputting the amount of correction of positional deviation to the respective positional deviation correcting part;
   wherein the input of the learning control part is positioned upstream of the output thereof.

* * * * *